(12) United States Patent
Dodd et al.

(10) Patent No.: US 8,353,483 B2
(45) Date of Patent: Jan. 15, 2013

(54) AIRCRAFT WING

(75) Inventors: Daniel Dodd, Bristol (GB); Francois Cathelain, Bristol (GB)

(73) Assignee: Airbus Operations Limited, Bristol (GB)

( * ) Notice: Subject to any disclaimer, the term of this patent is extended or adjusted under 35 U.S.C. 154(b) by 780 days.

(21) Appl. No.: 12/279,126

(22) PCT Filed: Feb. 7, 2007

(86) PCT No.: PCT/GB2007/000429
§ 371 (c)(1),
(2), (4) Date: Aug. 12, 2008

(87) PCT Pub. No.: WO2007/099285
PCT Pub. Date: Sep. 7, 2007

(65) Prior Publication Data
US 2009/0008506 A1    Jan. 8, 2009

(30) Foreign Application Priority Data

Feb. 28, 2006 (GB) .................................. 0604026.5

(51) Int. Cl.
*B64C 3/58* (2006.01)
(52) U.S. Cl. .......................................... 244/214; 244/213
(58) Field of Classification Search .................. 244/213, 244/214, 216
See application file for complete search history.

(56) References Cited

U.S. PATENT DOCUMENTS

| | | | | |
|---|---|---|---|---|
| 2,973,925 A | * | 3/1961 | Wiele | 244/203 |
| 3,486,720 A | * | 12/1969 | Seglem et al. | 244/210 |
| 3,576,301 A | * | 4/1971 | Stickle | 244/216 |
| 4,189,120 A | * | 2/1980 | Wang | 244/214 |
| 4,311,291 A | * | 1/1982 | Gilbertson et al. | 244/211 |
| 4,384,693 A | * | 5/1983 | Pauly et al. | 244/207 |
| 4,398,688 A | | 8/1983 | Williams | |
| 4,399,970 A | | 8/1983 | Evans | |
| 4,637,573 A | | 1/1987 | Perin et al. | |
| 5,056,741 A | * | 10/1991 | Bliesner et al. | 244/214 |
| 5,167,383 A | | 12/1992 | Nozaki | |
| 5,653,406 A | * | 8/1997 | Amano et al. | 244/130 |
| 6,073,889 A | | 6/2000 | Dees et al. | |

(Continued)

FOREIGN PATENT DOCUMENTS

| | | |
|---|---|---|
| EP | 0148658 A1 | 7/1985 |
| GB | 2246987 | 9/1992 |
| WO | WO 2005070762 A1 * | 8/2005 |

OTHER PUBLICATIONS

ISR and Written Opinion for PCT/GB2007/000429 dated Jul. 4, 2007.
UK Search Report for GB0604026.5 dated Jun. 16, 2006.

*Primary Examiner* — Jeremy R Severson
*Assistant Examiner* — Howard Sanders
(74) *Attorney, Agent, or Firm* — Lowe Hauptman Ham & Berner LLP

(57) ABSTRACT

An aircraft wing comprises a leading-edge slat, the slat including a main body portion and a slat extension arranged at a spanwise end of the main body portion. The cross-sectional area of the slat extension is less than the cross-sectional area of the main body portion. The slat extension may therefore provide some of the aerodynamic benefits of the slat, while enabling the volume of the leading-edge of the wing on which the slat is mounted, to be relatively large. The chord and thickness to chord ratio of the slat extension may be less than the equivalent dimensions on the slat.

16 Claims, 5 Drawing Sheets

U.S. PATENT DOCUMENTS

| | | | | |
|---|---|---|---|---|
| 6,152,404 | A * | 11/2000 | Flaig et al. | 244/199.1 |
| 6,364,254 | B1 | 4/2002 | May | |
| 6,435,458 | B1 * | 8/2002 | Bliesner | 244/214 |
| 6,598,834 | B2 * | 7/2003 | Nettle et al. | 244/215 |
| 6,978,971 | B1 * | 12/2005 | Dun | 244/214 |
| 7,357,358 | B2 * | 4/2008 | Lacy et al. | 244/214 |
| 7,731,128 | B2 * | 6/2010 | Overbergh et al. | 244/214 |
| 2005/0006752 | A1 | 1/2005 | Ogawa | |
| 2005/0045764 | A1 * | 3/2005 | Morgenstern et al. | 244/10 |
| 2005/0224662 | A1 | 10/2005 | Lacy et al. | |
| 2006/0102803 | A1 * | 5/2006 | Wheaton et al. | 244/214 |
| 2011/0049305 | A1 * | 3/2011 | Kafyeke et al. | 244/214 |

\* cited by examiner

AIRCRAFT WING

RELATED APPLICATIONS

The present application is based on International Application Number PCT/GB2007/000429, and claims priority from British Application Number 0604026.5 filed Feb. 28, 2006, the disclosures of which are hereby incorporated by reference herein in their entirety.

BACKGROUND OF THE INVENTION

The present invention relates to a leading-edge slat for an aircraft wing, an aircraft wing for use with or including such a slat and an aircraft including such a wing.

Leading-edge slats on aircraft wings are known to be aerodynamically beneficial. In particular, by delaying the onset of stall on the wing, leading-edge slats tend to allow an aircraft to be flown at higher angles of attack than could otherwise be achieved. On many aircraft wings, it is therefore desirable to have a leading-edge slat that extends as far as possible along the wing.

The part of a wing on which a slat is mounted tends to be significantly recessed to accommodate the slat. The spanwise extent of a leading-edge slat is often therefore restricted due to, for example, the presence of other structural elements (such as the engine pylon) which cannot accommodate such a recess, or by the need to house aircraft systems (such as de-icing equipment, hydraulics and/or electrics) which can require significant storage space in the region of the wing leading-edge. The parts of the wing that cannot accommodate the relatively large recess, and hence the slat, may be prone to suffering premature flow degradation and stall, relative to the other parts of the wing.

The design of the slat end-face(s), particularly on swept wings, may also be limited by the size of the aircraft wing structure that surrounds the slat end-face in use. Therefore the shape of the slat end-face(s) may not be as aerodynamically beneficial as is desirable.

SUMMARY OF THE INVENTION

The present invention seeks to mitigate or remove at least one of the above-mentioned problems. Alternatively, or additionally, the present invention seeks to provide an improved leading-edge slat.

The present invention provides an aircraft wing comprising a leading-edge slat, the slat including a main body portion and a slat extension arranged at a spanwise end of the main body portion, wherein the cross-sectional area of the slat extension, in a first vertical plane containing the aircraft wing chord, is less than the cross-sectional area of the main body portion, in a second vertical plane containing the aircraft wing chord. The slat extension provides at least some of the aerodynamic benefits of a slat, whilst allowing the wing in the region behind the extension to be relatively voluminous. Thus, the leading-edge slat of the present invention may extend further along the wing than known leading-edge slats, without, for example, compromising the ability of the wing to house various aircraft systems. Alternatively, or additionally, the leading-edge slat of the present invention may extend closer than known leading-edge slats, to certain structural elements on the wing, such as an engine pylon.

The cross-sectional area of the slat extension may be less than 80%, more preferably less than 60%, and yet more preferably less than 50% of the cross-sectional area of the main body portion. The cross-sectional area of the slat extension may be less than 40%. In certain embodiments the cross-sectional area may be less than 30%, and may even be less than 20% of the cross-sectional area of the main body portion or even less than 10% of the cross-sectional area of the main body portion. It will be understood that reference herein to cross-section (or derivatives thereof) relates, unless stated otherwise, to the cross-section in a vertical plane containing the aircraft wing chord.

The cross-sectional area of the slat extension may be more than 2% and more preferably more than 5% of the cross-sectional area of the main body portion. In certain embodiments the cross-sectional area of the slat extension may be more than 10% of the cross-sectional area of the main body portion.

The slat extension and the main body portion may meet at a junction, the cross-sectional area of the slat varying sharply across the junction. It will be understood that the cross-sectional area of the slat varies sharply if the area changes by more than 20%, more preferably more than 30%, and yet more preferably more than 50% within a distance along the wing of 0.1% aircraft span.

The slat extension may have a substantially constant cross-sectional area, and more preferably a substantially constant cross-sectional shape, along substantially its entire length. The main body portion may have a substantially constant cross-sectional area, and more preferably a substantially constant cross-sectional shape, along substantially its entire length. The respective cross-sectional shapes of the slat extension and the main body portions being substantially constant may of course have the consequence that the change in cross-sectional area between the extension and the main portion is sharp.

The slat extension may be blended with the main portion. The slat extension may comprise a blended region that extends to the main body portion, the cross-sectional area of the blended region, in vertical planes containing the aircraft wing chord, varying smoothly across the blended region. Alternatively, the main body portion may comprise a blended region that extends to the slat extension, the cross-sectional area of the blended region, in vertical planes containing the aircraft wing chord, varying smoothly across the blended region. It will be understood that the cross-sectional area varies smoothly over a given region if within the region there is no portion of the slat for which the area changes by more than 5%, more preferably more than 3%, and yet more preferably more than 2% within a distance along the wing of 0.02% aircraft span.

The cross-sectional profile of the slat extension may differ considerably from the cross-sectional profile of the main body portion. In certain embodiments of the invention, however, the two cross-sections are relatively similar in profile (but are, of course, of different sizes).

The leading-edge profile of the slat extension may correspond to at least part of the leading-edge profile of the main body portion. Alternatively only part, for example only 80% or only 50%, of the leading-edge profile of the slat extension may correspond to part of the leading-edge profile of the main body portion. It will be understood that the leading-edge profile refers to the profile of the face of the slat that is exposed, during use, to a free-stream air flow. Having substantially identical leading-edge profiles may provide a structure that is aerodynamically advantageous, and preferably aerodynamically optimum, along the length of the slat.

Alternatively, or additionally, at least part of the leading-edge profile of the slat extension may be contiguous with at least part of the leading-edge profile of the main body portion. Having contiguous leading-edge profiles results in a smooth leading-edge along the length of the slat, which tends to be aerodynamically advantageous.

The slat extension, and more preferably the slat, may comprise a rear face, the rear face complementing the profile of the part of the aircraft wing in front of which the slat extension, and more preferably the slat, is mounted. The rear face of the slat extension may be positioned forward of the rear face of the main body portion. The rear face of the slat extension need not therefore be contiguous with the rear face of the main body portion.

The average chord of the slat extension may be less than the average chord of the main body portion. The average chord of the slat extension may be less than 80%, and more preferably less than 60% of the chord of the slat main body portion. In certain embodiments the average chord of the slat extension may be less than 40%, or even less than 30%, of the average chord of the main body portion. The chord of the slat and/or slat extension will usually be readily identifiable to the skilled man. In the event of any uncertainly, the chord may be defined as the notional line joining the trailing edge of the slat/slat extension to a particular point on the leading-edge of the slat/slat-extension, the tangent to the aerofoil at said particular point being perpendicular to the slat/slat extension chord.

The average thickness of the slat extension may be less than the average thickness of the main body portion. The average thickness may be less than 80%, and more preferably less than 60% of the thickness of the main body portion. The average thickness may even be less than 40%, or even less than 30% of the thickness of the main body portion. The average thickness-to-chord ratio of the slat extension may be less than 150%, more preferably less than 120% of the average thickness-to-chord ratio of the main body portion. In certain embodiments of the invention, the thickness of the slat extension decreases proportionally more than the chord of the slat extension, with respect to the main body portion. Thus, the average thickness-to-chord ratio of the slat extension may be less than the average thickness-to-chord ratio of the main body portion. The average thickness-to-chord ratio of the slat extension may be less than 90% of the average thickness-to-chord ratio of the main body portion. The average thickness-to-chord ratio of the slat extension may be less than 80% and may even be less than 70% of the average thickness-to-chord ratio of the main body portion.

The slat extension may have an end that tapers. The thickness and/or chord of the slat extension may progressively reduce from the spanwise end of the main body portion towards the end of the slat extension.

The thickness of the slat/slat extension will typically be readily identifiable. In the event of any uncertainly, the thickness may be defined as the largest value of the perpendicular distance from the slat/slat extension chord, to the upper-surface of the slat/slat extension.

The slat main body portion and/or slat extension may be of substantially constant cross-section along their lengths, in which case the average chord and average thickness are substantially identical to the chord and thickness at any given cross-section of the main body portion and/or slat extension.

The wing may further comprise a structural element, for example an engine pylon or a wing tip device, the slat extension being arranged at the spanwise end of the main body portion closest to the structural element. The slat extension may be at the spanwise end of the slat closest to the wing tip. The slat may comprise two slat extensions, the two slat extensions being located at both spanwise ends of the slat.

According to another aspect of the invention, there is provided an aircraft wing comprising a leading-edge slat, the slat comprising a front face defining a continuous leading-edge running from a first spanwise end to a second spanwise end of the slat, and a rear face located opposite the front face, wherein the rear face includes a first portion and a second portion, the second portion being recessed with respect to the first portion. The thickness of the leading-edge slat in the region of the second portion is thus less than (for example less than 90% of and preferably less than 75% of) the thickness of the leading-edge slat in the region of the first portion. The second portion may be located at a spanwise end of the slat. The recessed second portion may be defined simply by means of a single step in the rear face.

It will of course be appreciated that this aspect of the invention relates to subject matter similar to other aspects of the invention described herein. Thus, features of this aspect of the invention may be incorporated into other such aspects of the invention or vice versa. For example, the first portion of the rear face of this aspect of the invention may form part of the main body portion of the slat of other aspects of the invention. Also, the second portion of the rear face of the slat according to this aspect of the invention may form a part of the slat extension of other aspects of the present invention described herein. Thus, features described in relation to the main body portion may be incorporated in this aspect of the invention in relation to the part of the leading edge slat that defines the first portion of the rear face of the slat, and vice versa. Similarly, features described in relation to the slat extension of other aspects of the present invention may be incorporated into the part of the leading edge slat of this aspect of the invention that defines the second portion of the rear face of the slat, and vice versa. For example, the cross-section of the slat in the region of the first portion may be of a similar shape, but different size, to the shape of the cross-section of the slat in the region of the second portion.

The wing may comprise a plurality of slats, each slat being as described herein.

According to yet another aspect of the present invention, there is provided a leading-edge slat for use on the aircraft wing described herein.

According to a further aspect of the invention there is provided an aircraft wing, at least part of the fore region of the wing being shaped so as to receive, and be complementary with, a leading-edge slat as described herein. Said part of the fore region of the wing may include first and second regions which are shaped such that, when the leading-edge slat is installed on the wing, the first region is complementary with the main body portion of the slat, and the second region is complementary with the slat extension, the second region protruding beyond the first region. It will be appreciated that the, relatively voluminous, second region may for example house various aircraft systems equipment. The aircraft wing may therefore benefit, during use, from the aerodynamic improvements generated by the presence of a slat stretching relatively far along the wing, whilst not necessarily suffering any adverse impact in storing aircraft systems equipment.

According to a further aspect of the present invention, there is provided an aircraft comprising an aircraft wing as described herein. The aircraft may be heavier than 50 tonnes dry weight, and more preferably heavier than 200 tonnes dry weight. The aircraft may be of a size equivalent to an aircraft designed to carry more than 75 passengers, and more preferably more than 200 passengers.

DESCRIPTION OF THE DRAWINGS

Various embodiments of the invention will now be described, by way of example only, with reference to the accompanying schematic drawings of which.

DETAILED DESCRIPTION

Figure 1:
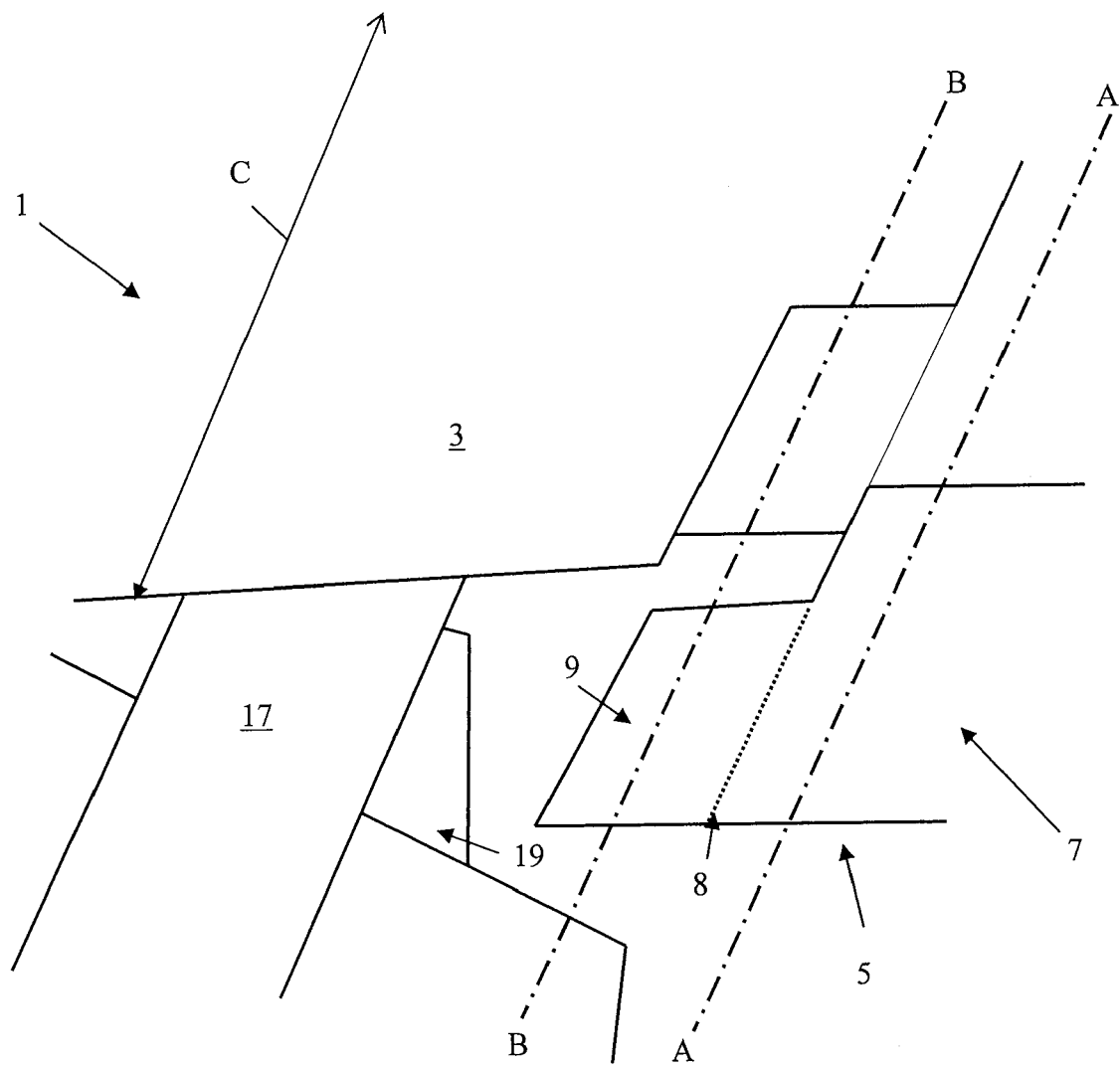
FIG. 1 is a plan view of part of an aircraft wing according to a first embodiment of the invention.

FIG. 1 shows a plan view of part of an aircraft wing 1 according to a first embodiment of the invention. The wing is on a large commercial aircraft and comprises a wing body 3, on the fore region of which is mounted a leading-edge slat 5. The leading-edge slat 5 includes a main body portion 7 and a slat extension 9 arranged at a spanwise end of the main body portion 7.

The wing 1 has an angle of sweep of 25 degrees. For the sake of clarity however, FIG. 1 is orientated such that the wing leading-edge runs across the page, and the exemplary aircraft wing chord C runs at an angle thereto.

In a similar fashion to known leading-edge slats, the slat 5 is moveable between a stowed position in which the slat is located against the wing body 3, and a deployed position (shown in FIG. 1) in which the slat 5 has been moved away from the wing body 3. The slat, in use, protects the fore of the wing from excessively steep adverse pressure gradients and thereby allows the aircraft to be flown at relatively high incidence. Such aerodynamic advantages will be fully understood by the person skilled in the art.

Figure 2:
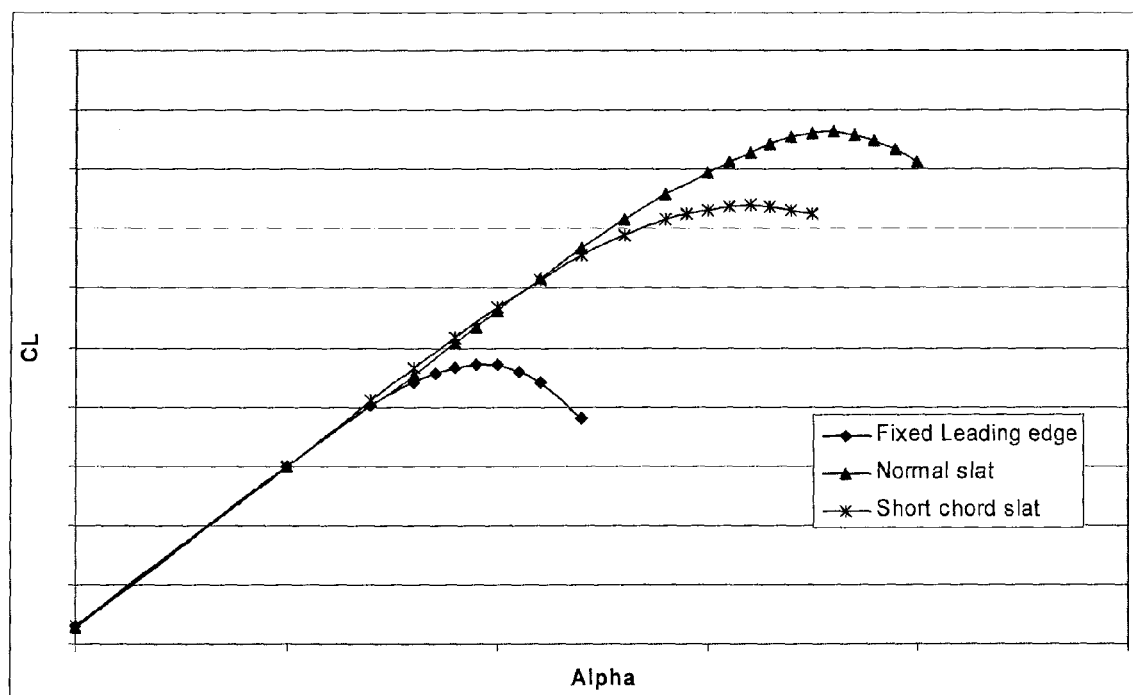
FIG. 2 is a CL-Alpha plot for 2D flow over three different aerofoil configurations.

The slat extension 9 has been found to be almost as effective as the slat main body 7 in improving high-incidence performance, and has been found to be a considerable improvement on a fixed leading-edge. This is clearly shown in FIG. 2 which shows CL-Alpha curves for 2D flow over three different aerofoil configurations—an unmodified aerofoil without a slat (fixed leading-edge), an aerofoil with a slat having a shape and cross-sectional area corresponding to the main body portion of the illustrated embodiment of the present invention (normal slat), and an aerofoil with a slat having a shape and cross-sectional area corresponding to the slat extension of the illustrated embodiment of the present invention (short-chord slat).

Figure 3:
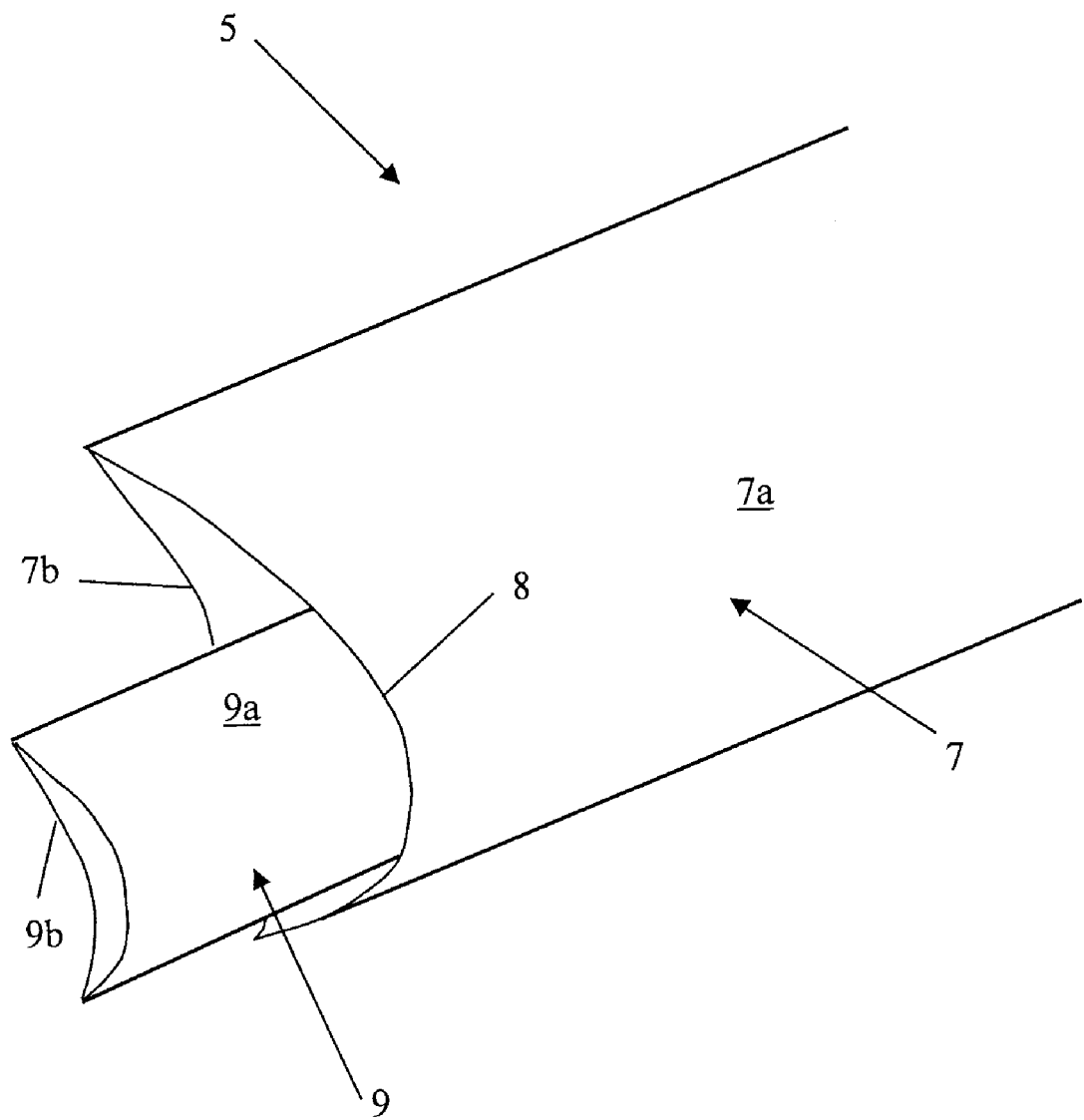
FIG. 3 is perspective view of the slat according to the first embodiment of the invention.

FIG. 3 shows a perspective view of the slat 5. The main body portion 7 and the slat extension 9 have, respectively, substantially constant cross-sections. The slat extension 9 is arranged at a spanwise end of the main body portion 7. The slat extension meets the main body portion 7 at a junction 8, across which the cross-sectional area of the slat changes sharply.

The main body portion 7 and the slat extension 9 comprise front faces 7a and 9a which, in use, are exposed to the free-stream air flow, and rear faces 7b and 9b which, when the slat is stowed, are located against the wing body 3. The leading-edge profile of the front face 9a of the slat extension 9 corresponds to the leading-edge profile of the front face 7a of the main body portion 7 that is adjacent to the slat extension 9. In addition, the leading-edge of the slat extension is contiguous with part of the leading-edge of the main body portion. The slat 5 therefore has a smooth leading-edge all the way along its length.

Figure 4A:
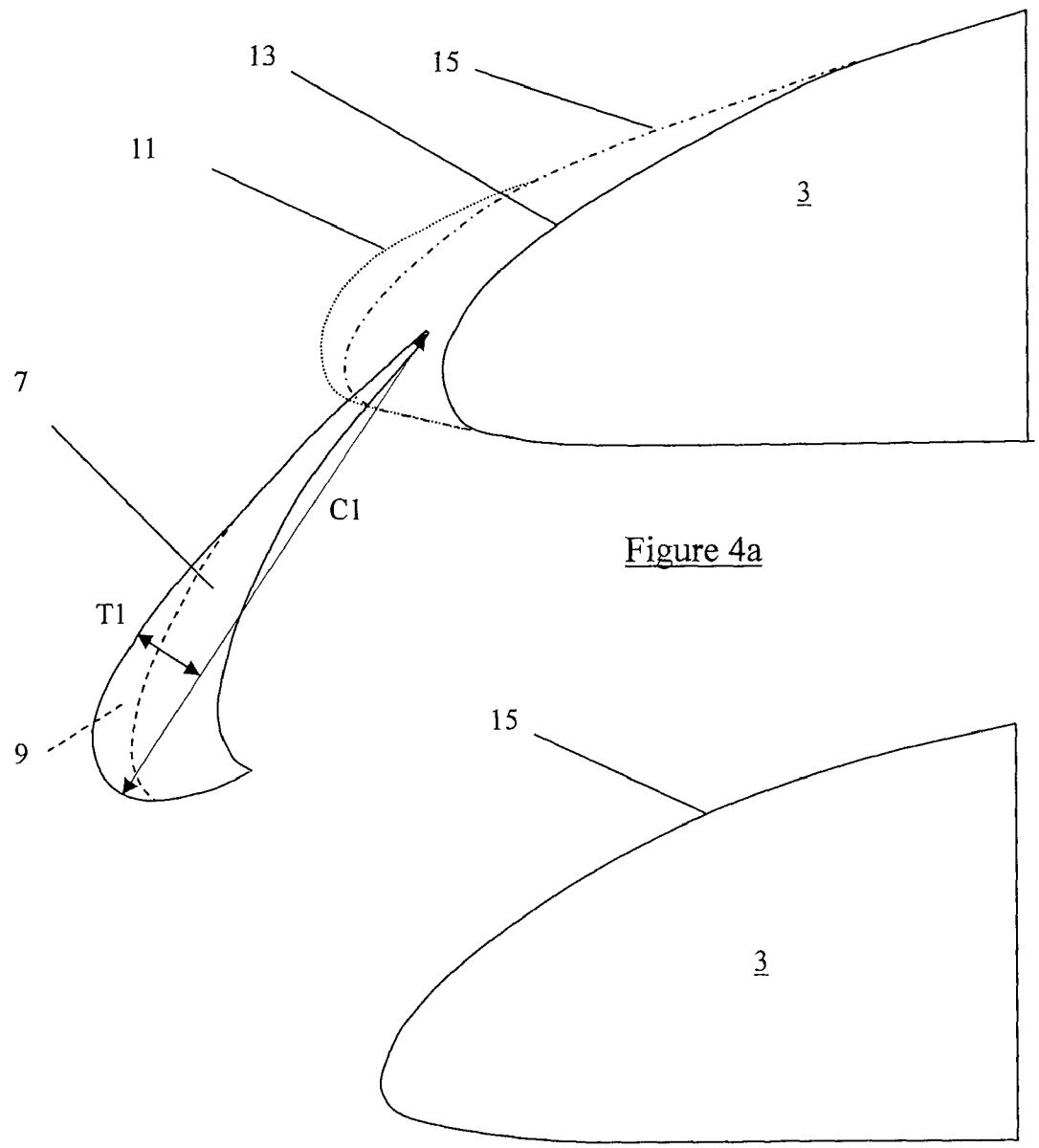
FIGS. 4a and 4b are sectional views of the wing according to the first embodiment of the invention.
Figure 4B:

FIGS. 4a and 4b are two sectional views of the slat 5. The sectional view of FIG. 4a is taken through a first vertical plane A-A (see FIG. 1) containing the wing chord and the sectional view of FIG. 4b is taken through a second vertical plane B-B (see FIG. 1) containing the wing chord (the wing chord C being substantially parallel at all locations along the wing—see FIG. 1).

FIG. 4a contains three phantom profiles; the cross-section of the slat extension 9 is shown by a dashed line, the clean wing profile 11 is shown by a dotted line, and the profile of the wing body 15 directly behind the slat extension is shown by a dash-dot line.

The slat main body portion 7 is of substantially uniform cross-section and has a chord C1 of 0.5 m, a thickness T1 of 0.06 m and a thickness-chord ratio T1/C1 of 0.12. The slat extension 9 is also of substantially uniform cross-section and has a chord C2 of 0.3 m (i.e. 60% of C1), a thickness T2 of 0.045 (i.e. 75% of T1), and a thickness to chord ratio T2/C2 of 0.15 (i.e. 125% of T1/C1). Thus the cross sectional area of the slat extension 9 in plane B-B is approximately 30% of the cross-sectional area of the main body portion 7 in plane A-A.

This reduction in cross-sectional area between the slat extension 9 and the main body portion 7 means that the region of the wing body 3 behind the slat extension can be relatively voluminous and is thus recessed less than the region of the wing behind the slat main body portion. This is most clearly shown in FIG. 5, which shows the fore region of the wing body 3 on which the slat is mounted.

Figure 5:
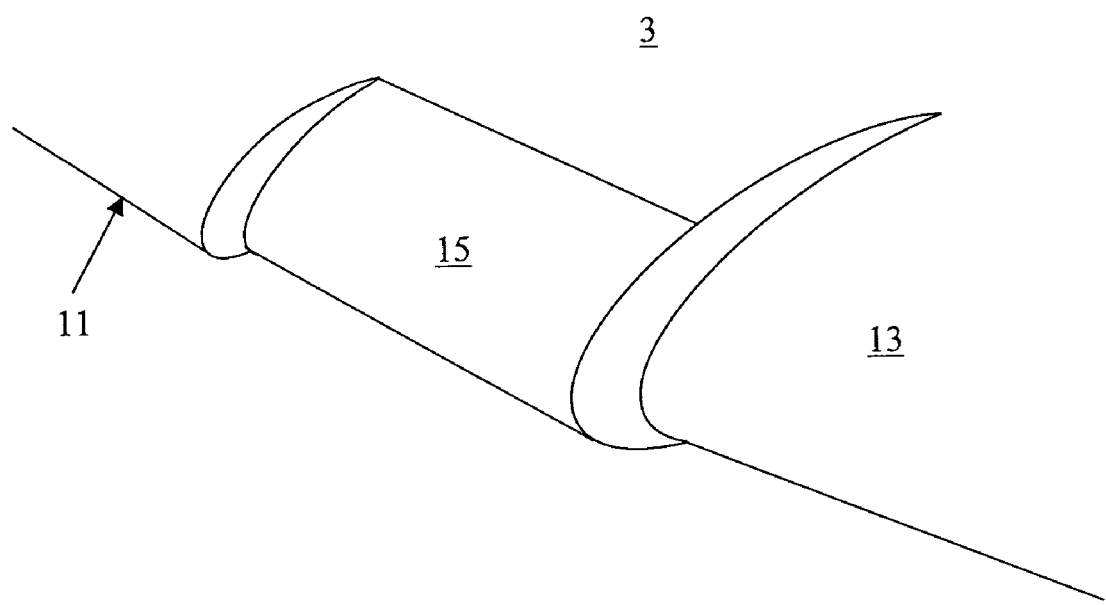
FIG. 5 is a perspective view of the fore region of the wing body of the first embodiment of the invention.

Referring to FIG. 5, the wing body 3 includes two regions that are recessed from the clean wing leading-edge 11. For the sake of clarity, the slat deployment mechanism is not shown. The first region 13 is shaped such that, when the slat 5 is installed on the wing, the region is complementary with the rear face 7a of the main body portion 7. The second region 15 is shaped such that, when the slat is installed on the wing, the region is complementary with the rear face 9a of the slat extension 9.

In the first embodiment of the invention, the distance by which the second region 15 is recessed from the clean wing 11 is sufficiently low that the second region 15 can accommodate aircraft structure necessary to support an engine pylon 17, and engine 19 (see FIG. 1). The aircraft is therefore able to benefit, in flight, from the effects of a slat over the length of the main body portion 7 and in the region close to the engine pylon 17 (this region being protected by the slat extension 9). Thus, the aircraft tends to suffer premature flow degradation and stall along a smaller length of wing, in comparison to certain known aircraft.

According to a second embodiment of the invention (not shown), the chord of the slat extension is 50% of the chord of the slat, the thickness of the slat-extension is 40% of the thickness of the slat, thus the thickness-chord ratio of the slat extension is 80% of the thickness-chord ratio of the slat and cross-sectional area of the slat extension is 20% of the cross-sectional area of the main body portion. The region of the wing behind the slat extension is sufficiently large to contain aircraft de-icing systems and actuators for deploying the slat. Again, the wing is therefore able to benefit, in flight, from the effects of a slat over the length of the main body portion and over the length of the slat extension, whilst not compromising the ability of the wing to house various aircraft systems.

The wing of the second embodiment of the invention also comprises a wing tip device. The leading-edge slat comprises a second slat extension at its other spanwise end close to the wing tip device. The slat extension protects the region of the wing that supports the wing tip device structure, whilst being of sufficiently small cross-sectional area to not compromise the size and strength, of the wing tip support structure.

An aircraft according to a third embodiment of the invention is primarily as described with reference to the first embodiment, except that the slat extension blends with the main body portion across a blended region. In the blended region, the cross-sectional area of the slat extension gradually decreases from the cross-sectional area of the adjacent part of the main body portion, to 50% of this value. The remainder of the slat extension comprises a central portion of constant cross-sectional area (equal to 50% of the main portion cross-sectional area) bounded at its outermost end by a tapered region. The thickness of the slat extension in the tapered region gradually decreases along its length.

The wing body is correspondingly shaped and the recess that accommodates the slat gradually decreases across both the blended region, and then again across the tapered region. The wing according to the third embodiment of the invention provides a relatively long slat and a more aerodynamically efficient slat-end configuration than some known aircraft wings, whilst still allowing a relatively voluminous wing behind the slat extension.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft wing comprising a leading-edge slat, the slat including:
   (i) a main body portion the front of which forms an aerodynamic surface exposed to free-stream airflow and the rear of which is shaped to complement the part of the wing behind the slat main body portion, and
   (ii) a slat extension arranged at a spanwise end of the main body portion and projecting therefrom, the front of which slat extension forms an aerodynamic surface exposed to the free-stream airflow and the rear of which slat extension is shaped to complement the part of the wing behind the slat extension,
   wherein the slat extension is fixed relative to the main body portion;
   wherein the leading-edge profile of the aerodynamic surface of the slat extension is contiguous with at least part of the leading edge profile of the aerodynamic surface of the main body portion, and
   wherein the rear of the slat extension is positioned forward of the rear of the slat main body portion such that the cross-sectional area of the slat extension, in a first vertical plane containing the aircraft wing chord, is less than the cross-sectional area of the main body portion, in a second vertical plane containing the aircraft wing chord.

2. An aircraft wing according to claim 1 wherein the cross-sectional area of the slat extension is less than 60% of the cross-sectional area of the main body portion.

3. An aircraft wing according to claim 2 wherein the cross-sectional area of the slat extension is less than 40% of the cross-sectional area of the main body portion.

4. An aircraft wing according to claim 1 wherein the cross-sectional area of the slat extension is more than 5% of the cross-sectional area of the main body portion.

5. An aircraft wing according to claim 1, the slat extension having substantially constant cross-sectional area along substantially its entire length.

6. An aircraft wing according to claim 1 wherein the slat extension and the main body portion meet at a junction, the cross-sectional area of the slat varying sharply across the junction.

7. An aircraft wing according to claim 1 wherein the average chord of the slat extension is less than the average chord of the main body portion.

8. An aircraft wing according to claim 7 wherein the average chord of the slat extension is less than 60% of the average chord of the main body portion.

9. An aircraft wing according to claim 8 wherein the average chord of the slat extension is less than 40% of the average chord of the main body portion.

10. An aircraft wing according to claim 1 wherein the average thickness of the slat extension is less than the average thickness of the main body portion.

11. An aircraft wing according to claim 10 wherein the average thickness-to-chord ratio of the slat extension is between 80% and 150% of the average thickness-to-chord ratio of the main body portion.

12. An aircraft wing according to claim 1, the wing further comprising an engine pylon, the slat extension being arranged at the spanwise end of the main body portion closest to the engine pylon.

13. A leading-edge slat for use on the aircraft wing according to claim 1.

14. An aircraft wing, at least part of the fore region of the wing being shaped so as to receive, and be complementary with, a leading-edge slat according to claim 13.

15. An aircraft wing according to claim 14, wherein said part of the fore region of the wing includes first and second regions which are shaped such that, when the leading-edge slat is installed on the wing, the first region is complementary with the main body portion of the slat, and the second region is complementary with the slat extension, the second region protruding beyond the first region.

16. An aircraft comprising an aircraft wing according to claim 1.

* * * * *